S. F. SWOOPE.
AUTOMATIC LUBRICATOR.
APPLICATION FILED FEB. 20, 1914.
1,128,198.
Patented Feb. 9, 1915.
2 SHEETS—SHEET 2.
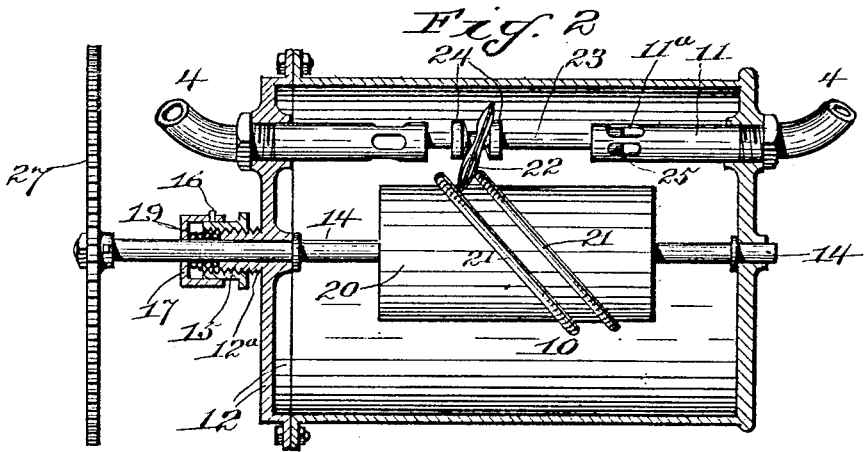
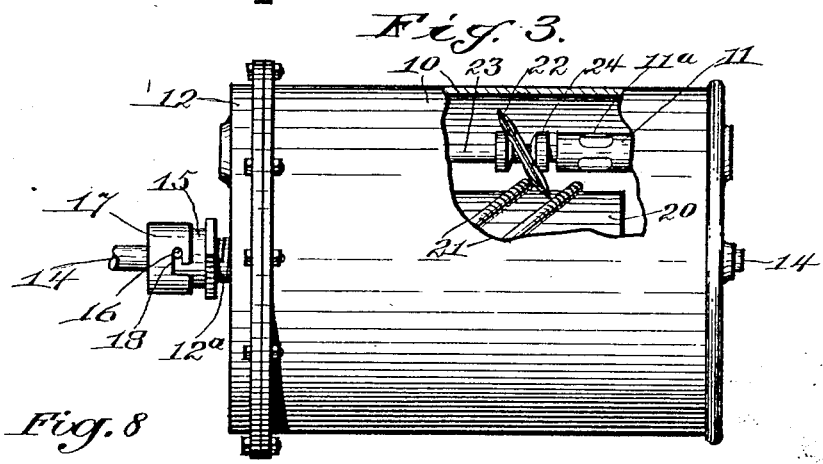
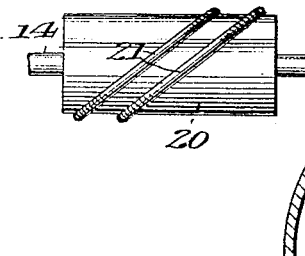
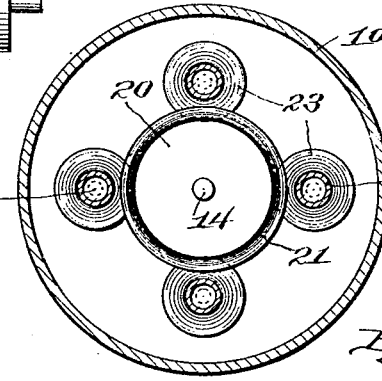
Witnesses:
R. F. Lansdale
S. Schwartz
Inventor
Samuel F. Swoope
By C. F. Belt
Attorney

UNITED STATES PATENT OFFICE.

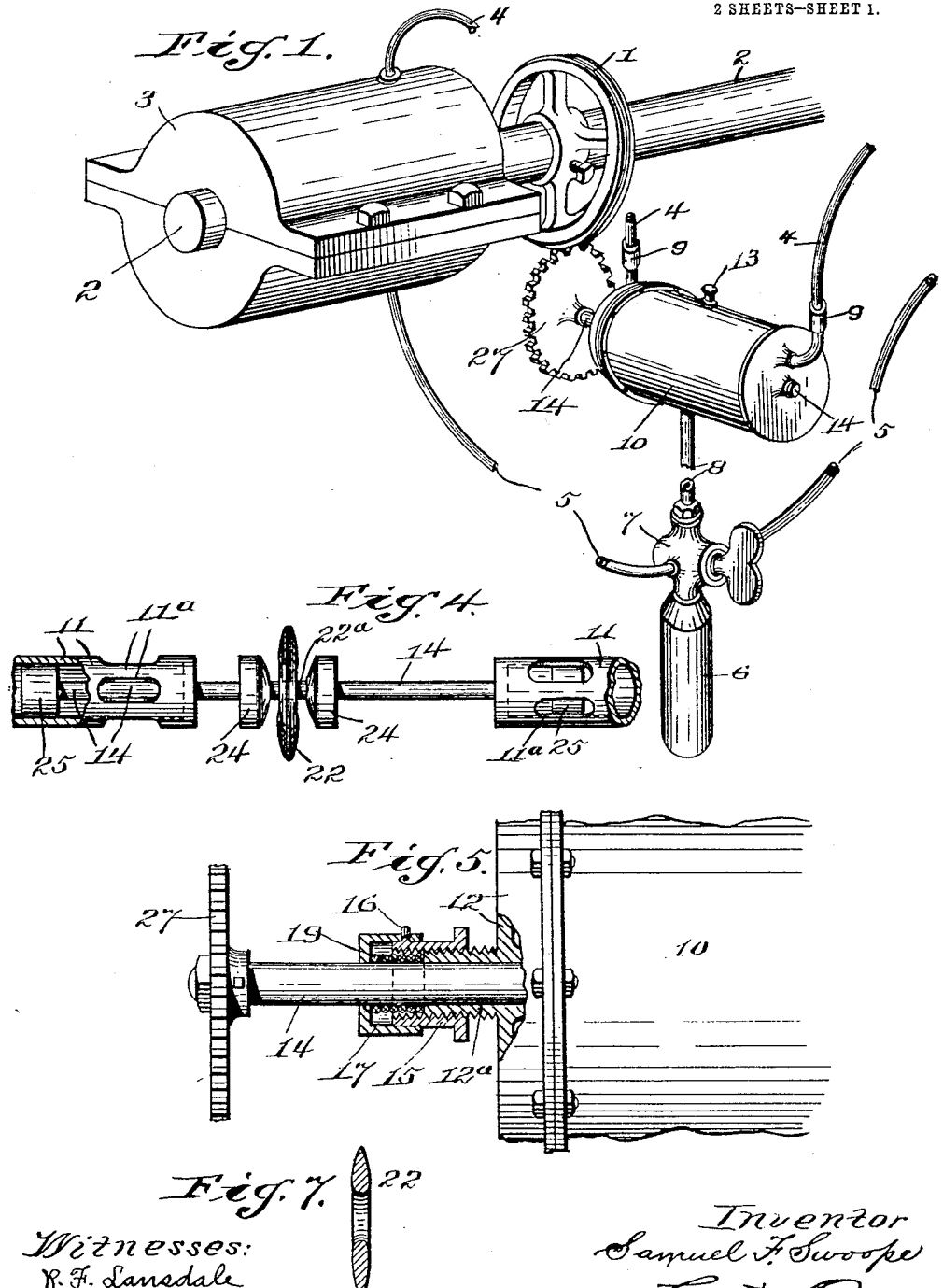

SAMUEL F. SWOOPE, OF CINCINNATI, OHIO.

AUTOMATIC LUBRICATOR.

1,128,198. Specification of Letters Patent. Patented Feb. 9, 1915.

Application filed February 20, 1914. Serial No. 820,036.

*To all whom it may concern:*

Be it known that I, SAMUEL F. SWOOPE, a citizen of the United States, residing at Cincinnati, in the county of Hamilton and State of Ohio, have invented certain new and useful Improvements in Automatic Lubricators, of which the following is a specification.

This invention relates to machines or apparatus for the distribution of lubricating material for line shaft journals, steam engines, motors, and the like, wherein a measured amount of lubricant is pumped from a reservoir into pipe conduits which conduct the lubricant to the parts of machinery requiring lubrication.

The object of the invention is to provide an improved lubricant propelling and distributing attachment for engines, motors, line-shaftings, and for other machinery or parts thereof, which attachment shall not be effected in operation by the usual irregularities and vibrations incident to such engines, motors, and other machines which are surcharged with heavy forces for operation.

A further object of the invention is to provide an improved oiling device adapted to be automatically operated by, through, or from the motive power of the machine to be lubricated, or from the line shafting to which the device is applied, so as to be independent of such shafting yet having such connections with the shafting as to be operated by the latter for feeding the lubricant to the shaft bearings, or journals during continuous revolution of the shaft, or at intervals according to the movement of the shaft.

A still further object of the invention is to provide an improved oiling device having such construction and relative arrangement of parts as to transmit the movement of said shaft to a shaft of the lubricator for revolving the lubricator shaft, and to provide means for converting the rotary movement of the lubricator shaft into a reciprocating movement of a pump rod contained in the lubricator.

A still further object of the invention is to provide a lubricating device having a central shaft driven by the machine or shafting intended for lubrication, and to provide said shaft with revoluble means coöperating with a disk loosely mounted on a pump rod of said device for reciprocating said rod.

Various other objects, advantages, and improved results are attainable in the practical application of the invention.

In the accompanying drawings forming part of this application:—Figure 1. is a side elevation showing the application of the invention to a journal bearing. Fig. 2. is a central longitudinal sectional view of the casing, showing the inclosed parts in elevation, and a conduit pipe at each end of the casing. Fig. 3. is a side elevation partly broken away showing the position of the piston rod reciprocated from the position shown in Fig. 2. Fig. 4. is an enlarged detail elevation of the piston rod, follower disk, and pump barrels partly broken away. Fig. 5. is a sectional view of the packing gland nut, showing part of the lubricator shaft and part of one end of the lubricator. Fig. 6. is a cross section of the casing showing a plurality of pumps. Fig. 7 is a sectional view of the disk. Figs. 8 and 9 are detail elevations of the drum having the elliptical track thereon.

The same reference characters denote the same parts throughout the several views of the drawings.

The oiling device may be operated by the revoluble shaft of any machine by applying a worm gear 1, to such shaft as 2, journaled in bearings as 3. One or more oil conveyer pipes 4 lead from the oiling device to the oil ducts of such bearings 3, or to other parts of machinery to be oiled, and such parts or bearings are drained or relieved of surplus or unused oil by one or more drain pipes 5, coupled to a receiver 6 by means of a cock 7, which is connected with the bottom of the cylinder of the oiling device by a drain pipe 8. The pipes 4 are provided, at 9 with ordinary gravity or lift valves which are opened by the pressure of oil from the pump of the oiling device, and said pipes 4 are connected, through the ends of the casing 10, with the ends of the pump barrels 11 having ducts 11ª. There may be a plurality of pumps and oil pipes for oiling a plurality of bearings or machine parts from one and the same oiling device, as shown in Fig. 6 of the drawings. The casing 10 has a removable end 12, provided with a hollow screw stem 12ª, and the casing not only incloses the essential parts of the device but forms an oil chamber or reservoir, and is provided with an oil supply closure 13.

A shaft 14 extends through and is revolubly mounted in the casing 10, while the latter is held in fixed position by the stand or drain pipe 8, and the pipes 4 and 5. In order to make a fluid-tight joint between the shaft and the removable end of the casing, a special packing nut is provided, and comprises a nut portion 15 fitting the end stem 12ª, and having a pin 16, a packing gland 17 fitting said portion and having an L-shaped slot 18 for the pin, and a suitable packing 19. The end of the shaft 10 extends through the gland 17 and the packing is removably held thereby and therein, and leakage of oil is thereby prevented. In applying the packing nut, the nut portion 15 is partially screwed into position so as to leave a space in the outer end of said portion for the packing, the gland is then locked to said portion by means of the slot and pin connection, and the nut is finally screwed up to proper position. The shaft 14 has mounted thereon and fixed thereto within the casing 10, a cylinder or drum 20, provided lengthwise with a pair of parallel flanges 21, forming an elliptical track for a revoluble follower disk 22 loosely mounted on the pump rod 23 between a pair of disk bearing collars 24 spaced apart central of the rod 23, so as to form a trunnion 22ª for the disk 22. The sides of the disk 22 are preferably convex for the purpose of adding strength and durability thereto, and for forming a better bearing surface for the flanges 21. The pump rod has piston heads 25 reciprocated in the pump barrels 11, by the rotary movement of the cylindrical drum 20 imparting to the rod 23, sliding movement by reason of the constant contact of the disk with one or the other of the track flanges 21, as clearly shown in Figs. 2 and 3 of the drawings, where it will be seen that the position of the disk is reversed at the end of each stroke of the pump rod during continuous revolution of the cylindrical drum. It will also be seen that the trunnion 22ª forms a pivot for the disk 22, and that the collars 24 form an abutment for the disk and control or limit the tilting movement thereof so as to fix it at the required angle of contact with the elliptical track flanges 21, for the best results, during a pumping operation.

The oiling device is operated by the shaft 2, or by the driven shaft of a motor or other machinery to be lubricated, so that the shaft 14 may be revolved at a very low speed compared with the high speed of the shaft 2, and while other gearing or equivalent means for revolving the shaft 14, as desired, or as occasion may demand, I preferably employ the worm wheel 1, secured to the shaft 2, and meshing with a gear wheel 27, secured to the end of the shaft 14 which projects through the packing nut. It has been found that a machine shaft revolving at the rate of thirty-six hundred revolutions per minute to twenty-one revolutions per minute of the oiling shaft, will operate the pump so as to discharge from forty to fifty drops of oil per minute, but the operation and means for producing the same may be varied as desired. Obviously the oil is fed, for lubrication, in amounts proportionate with the velocity of the part or parts to be lubricated, without adjustment or manipulation of the parts of the oiling device for such purpose. It will be understood that the size of the pump-barrel ducts 11ª, may be varied as desired or as occasion may demand.

The working capacity of the oiling device and the results thereof are attainable in a device occupying an unusually small space, which is of great advantage in the general application and installation thereof. For example, a drum or cylinder provided with an elliptical track having substantially the pitch shown in the accompanying drawings and making thirty revolutions per minute would produce thirty discharges of lubricant per minute from one pump barrel, and in continuous operation, the device would deliver, approximately, eighteen to twenty cubic inches of lubricant per hour.

I do not wish to be understood as limiting my invention to any particular size, capacity, or material, nor to the number of pumps, or to the driving connection for the track cylinder, but reserve to myself the right to make such changes and variations in the device and in its application as may be found expedient in the practical working thereof under various conditions, without departing from the spirit of the invention as set forth in the appended claims.

Having thus described my invention what I claim as new and desire to secure by Letters Patent is:—

1. In an automatic lubricator, a pair of pump barrels, a reciprocating pump rod for the barrels, a revoluble cylindrical drum having an elliptical track, and a disk loosely mounted on the rod in engagement with the track for reciprocating the rod.

2. In an automatic lubricator, a plurality of pump barrels arranged in endwise pairs, a reciprocating pump rod for each pair of barrels, a revoluble cylindrical drum having an elliptical track, and a disk loosely mounted on each rod in engagement with the track for reciprocating the rod.

3. In an automatic lubricator, a pair of pump barrels, a reciprocating pump rod for the barrels, a revoluble cylindrical drum having an elliptical track, and a disk loosely mounted on the rod in engagement with the track for reciprocating the rod.

4. In an automatic lubricator, a plurality of pump barrels arranged in endwise pairs, a reciprocating pump rod for each pair of barrels, a revoluble cylindrical drum having an elliptical track, and a disk loosely mounted on each rod in engagement with the track for reciprocating the rod.

5. In an automatic lubricator, a pump barrel, a reciprocating pump rod for the barrel, a revoluble drum having an elliptical track, and a disk loosely mounted on the rod and adapted to be given rotary and fulcrum movements by the track for reciprocating the rod.

6. In an automatic lubricator, the combination, with a casing forming an oil reservoir, a drum having an elliptical track revolubly mounted in the casing, oil pumps contained in the casing, a disk loosely mounted on the pump rods in engagement with the track for converting the rotary movement of the track into sliding movement of the pump rods, and means for operating the track.

7. In a lubricator, the combination of a casing forming a reservoir, a pump barrel at each end of and within the casing, a pump rod within the casing and free to reciprocate longitudinally in the barrels, a drum having an elliptical track and revolubly mounted within the casing, a tilting disk loose upon the rod, means for limiting the tilting movement of the disk so as to hold the disk in engagement with the track for reciprocating the rod, and means for revolving the track.

8. In a lubricator, the combination of a casing forming an oil reservoir, a plurality of oil pump barrels within the casing, a pump rod for each pair of barrels, a drum within the casing and having an elliptical track thereon, a shaft journaled in the ends of the casing for revolving the drum, a disk loosely mounted on the rods in engagement with the track for reciprocating the rods parallel with the shaft, means upon the rods for limiting the lateral movement of the disk on the rods, and means for revolving said shaft.

9. In a lubricator, the combination of a casing forming an oil reservoir, a plurality of oil pump barrels within the casing, a pump rod for each pair of barrels, oil pipes leading from each barrel through the ends of the casing, a gravity valve in each of said pipes, a drum within the casing and having an elliptical track thereon, a shaft journaled in the ends of the casing for revolving the drum, a disk loosely mounted on the rods in engagement with the track for reciprocating the rods parallel with the shaft, means upon the rods for limiting the lateral movement of the disk on the rods, and means for revolving the said shaft.

10. In means for operating oil lubricating pumps, a pump rod, a disk loosely mounted on the rod for rotary and tilting movement, an elliptical track engaged by the disk for reciprocating the rod, and means upon which the track is mounted for revolving the track.

11. In means for operating oil lubricating pumps, a pump rod, a disk loosely mounted on the rod for rotary and tilting movement, a cylindrical drum, parallel flanges encircling the drum and forming an elliptical track for the disk, and means for revolving the drum during the engagement of the disk with the track for reciprocating the said rod.

In witness whereof I hereunto set my hand in the presence of two witnesses.

SAMUEL F. SWOOPE.

Witnesses:
 ROBERT B. HOLFORD,
 W. R. ROSSETER.

Copies of this patent may be obtained for five cents each, by addressing the "Commissioner of Patents, Washington, D. C."